(12) United States Patent
Buchsbaum

(10) Patent No.: US 10,803,316 B2
(45) Date of Patent: Oct. 13, 2020

(54) COMPUTER APPLICATIONS INTEGRATED WITH HANDHELD OPTICAL DEVICES HAVING CAMERAS

(71) Applicant: Meopta U.S.A., Inc., Trinity, FL (US)

(72) Inventor: Philip E. Buchsbaum, Oldsmar, FL (US)

(73) Assignee: Meopta U.S.A., Inc., Trinity, FL (US)

( * ) Notice: Subject to any disclaimer, the term of this patent is extended or adjusted under 35 U.S.C. 154(b) by 0 days.

(21) Appl. No.: 16/502,567

(22) Filed: Jul. 3, 2019

(65) Prior Publication Data

US 2020/0012856 A1  Jan. 9, 2020

Related U.S. Application Data

(60) Provisional application No. 62/694,455, filed on Jul. 6, 2018.

(51) Int. Cl.
| | | |
|---|---|---|
| *G06K 9/00* | (2006.01) | |
| *H04W 4/80* | (2018.01) | |
| *G02B 27/01* | (2006.01) | |
| *G06F 3/14* | (2006.01) | |
| *H04N 5/225* | (2006.01) | |
| *H04W 88/02* | (2009.01) | |

(52) U.S. Cl.
CPC ..... *G06K 9/00671* (2013.01); *G02B 27/0101* (2013.01); *G06F 3/14* (2013.01); *H04N 5/2257* (2013.01); *H04W 4/80* (2018.02); *H04W 88/02* (2013.01)

(58) Field of Classification Search
CPC ............ G02B 27/01; G02B 2027/0138; G02B 27/017; G02B 2027/0178; B60R 2021/01088; G01G 23/3728; B60K 2370/782; F41G 1/38; F41G 1/473; F41G 3/00; F41G 3/06; F41G 11/00; A63B 71/0619; G06K 9/00671
See application file for complete search history.

(56) References Cited

U.S. PATENT DOCUMENTS

| | | | | |
|---|---|---|---|---|
| 6,822,802 B2* | 11/2004 | Nakano | .................. | G02B 23/04 359/381 |
| 7,484,847 B2* | 2/2009 | Fuziak, Jr. | ......... | G02B 27/0172 345/7 |
| 7,567,287 B2* | 7/2009 | Hyatt | ................. | G02B 13/0065 348/340 |
| 8,820,644 B2* | 9/2014 | Ferren | .................. | G02B 13/009 235/462.21 |
| 10,648,781 B1* | 5/2020 | Behiel | ....................... | F41G 1/46 |
| 2006/0005447 A1* | 1/2006 | Lenner | .................... | F41G 3/165 42/111 |
| 2006/0180371 A1* | 8/2006 | Breed | .............. | B60R 21/01516 180/197 |
| 2008/0133592 A1* | 6/2008 | Peters | ................... | G06F 16/532 |
| 2008/0233543 A1* | 9/2008 | Guissin | ................ | F41G 3/2605 434/19 |

(Continued)

*Primary Examiner* — Sargon N Nano
(74) *Attorney, Agent, or Firm* — Dennis L. Cook, Esq.

(57) ABSTRACT

Handheld optical devices (HOD) such as binoculars, spotting scopes and riflescopes that have an integrated camera wherein the camera, via Bluetooth and/or Wi-Fi, sends an image to a mobile phone, which then processes the image with a third party computer application for real time identification of the object being viewed are disclosed.

2 Claims, 1 Drawing Sheet

(56) References Cited

U.S. PATENT DOCUMENTS

| | | | | |
|---|---|---|---|---|
| 2008/0276191 | A1* | 11/2008 | Breed | B60N 2/002 715/771 |
| 2010/0322483 | A1* | 12/2010 | Margolis | G06K 9/00979 382/110 |
| 2011/0003269 | A1* | 1/2011 | Portoghese | F41A 33/02 434/18 |
| 2012/0178053 | A1* | 7/2012 | D'Souza | F41G 3/06 434/22 |
| 2013/0249948 | A1* | 9/2013 | Reitan | G06T 19/006 345/633 |
| 2014/0059915 | A1* | 3/2014 | Sammut | F41G 3/00 42/122 |
| 2015/0042873 | A1* | 2/2015 | Hunt | H04N 5/2254 348/373 |
| 2015/0146004 | A1* | 5/2015 | Kritt | G06K 9/00671 348/159 |
| 2015/0149079 | A1* | 5/2015 | Breed | B60N 2/0244 701/428 |
| 2015/0323286 | A1* | 11/2015 | Theriault | F42B 12/38 42/111 |
| 2016/0125276 | A1 | 5/2016 | Spicola, Sr. et al. | |

\* cited by examiner

COMPUTER APPLICATIONS INTEGRATED WITH HANDHELD OPTICAL DEVICES HAVING CAMERAS

CROSS-REFERENCE TO RELATED APPLICATION

The present application claims the benefit of previously filed Provisional Patent Application, Ser. No. 62/694,455, filed on Jul. 6, 2018.

FIELD OF THE INVENTION

The device and method of this disclosure belongs to the field of sighting and identifying instruments. More specifically it is the device and method of using handheld optical devices (HOD) such as binoculars, spotting scopes and riflescopes that have an integrated camera. The camera, via Bluetooth and/or Wi-Fi, sends an image to a mobile phone, which processes and identifies the image with a third-party computer application. For example, the computer application would analyze the picture and tell the user what birds the user is looking at with the handheld optical device. The mobile phone has a computer application that streamlines the entire process so that the user can snap pictures and see results virtually instantaneously.

BACKGROUND OF THE INVENTION

Handheld optical devices are routinely used in hunting and other sports, allowing a user to spot and target prey from a distance. But many times, the user is not able to identify that prey with certainty. Mobile phones with cameras are also now a common item and most hunters would have one with them for safety and communication needs while hunting. Also, real time identification computer applications are now increasingly available to identify songs by listening or flora and fauna by snapping a picture.

A novel combination of these emerging technologies enables the real time prey identification device and method of this disclosure that is useful for real time identification of objects viewed through handheld optical devices. Thus, there is a need for an object identification device and method using a combined handheld optical device integrated with a camera and mobile phone using computer applications.

BRIEF SUMMARY OF THE INVENTION

What is disclosed are the device and method of using hand held optical devices (HODs) such as binoculars, spotting scopes and riflescopes that have an integrated camera, wherein the camera, via Bluetooth and/or Wi-Fi, sends an image to a mobile phone, which then processes the image with a third party computer application for real time identification of the object being viewed. For example, the computer application would analyze the camera's captured image and tell the user what birds the user is looking at with the handheld optical device. The mobile phone has a computer application that streamlines the entire process so that the user can snap images and see results virtually instantaneously.

BRIEF DESCRIPTION OF THE DRAWINGS

For a fuller understanding of the nature and objects of the invention, reference should be made to the following detailed description, taken in connection with the accompanying drawings, in which.

DESCRIPTION OF THE PREFERRED EMBODIMENT

Figure 1:
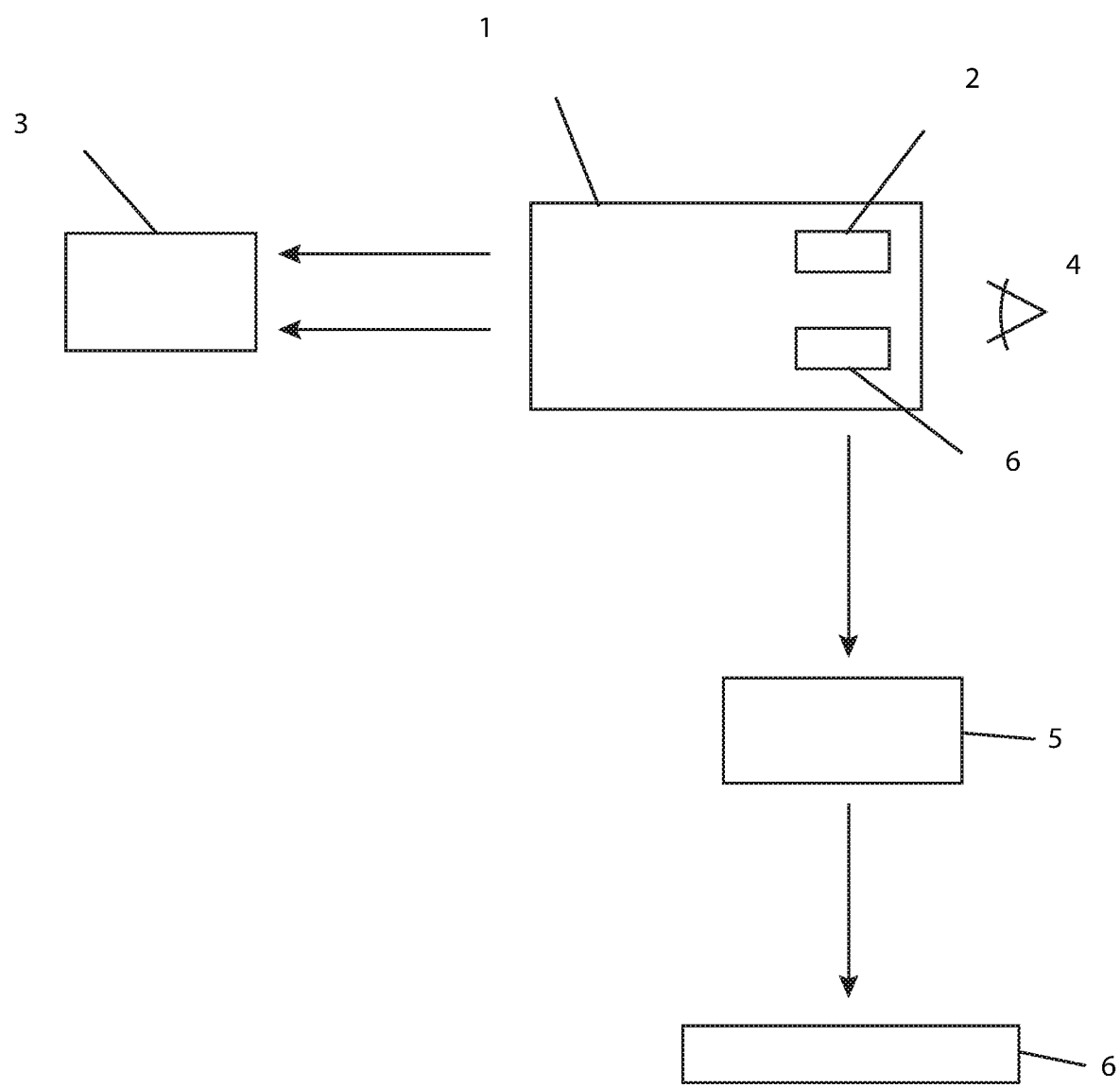
FIG. 1 shows a preferred embodiment optical/electrical/mechanical diagram of the combined handheld optical device integrated with a camera and mobile phone of this disclosure.

As discussed above the invention of this disclosure is useful for real time identification of an object sited through handheld optical devices such as binoculars, spotting scopes and riflescopes that have an integrated camera, wherein the camera, via Bluetooth and/or Wi-Fi, sends an image to a mobile phone, which processes the image with a third party computer application.

As shown in the preferred embodiment optical/electrical/mechanical diagram of the combined handheld optical device integrated via Bluetooth/Wi-Fi and computer applications with a camera and mobile phone of FIG. 1, the novel device and method of this disclosure includes a handheld optical device (1) that is integrated with a camera (2) such that the camera (2) views through the optics of the handheld optical device (1) and can focus on the same object (3) that the observer (4) does. When the observer (4) sees an object (3) such as prey that he/she wants to identify the observer (4) takes a picture that is then transferred via a Bluetooth, Wi-Fi, or other similar connection to a mobile phone (5) running a computer application that's enabled, processes the picture of the object (3), transfers that processed picture via cell or Wi-Fi signal to an application service provider that further processes and identifies the object (3). The application service provider then transmits the identification information back to the mobile phone (5), which then either displays identification on the mobile device (5) display or further transmits the identification information to a Heads Up Display (6) that displays the identification information on the handheld optical device's (1) optics such that the observer (4) sees the identification information in real time without having to lower the handheld optical device from his/her eye(s).

Since certain changes may be made in the above described device and method of using a combined handheld optical device integrated via Bluetooth/Wi-Fi and computer applications with a camera and mobile phone of this disclosure for object identification without departing from the scope of the invention herein involved, it is intended that all matter contained in the description thereof or shown in the accompanying figures shall be interpreted as illustrative and not in a limiting sense.

What is claimed is:

1. An object identification method using a combined handheld optical magnifying device integrated with a camera, a Heads up Display, and a mobile phone comprising:
    a handheld optical magnifying device integrated with a camera wherein said camera views through the optics of said handheld optical magnifying device and said camera focuses on the same object that said handheld optical magnifying device focuses on;
    wherein when an observer looking through said handheld optical magnifying device sees said object that said observer wants to identify said observer first takes a picture of said object with said camera;
    then said picture is transferred via a Wireless Radio Frequency connection to a mobile phone running a computer application;
    then said mobile phone computer application processes said picture of said object and said mobile phone transfers said processed picture via a Wireless Radio Frequency connection to an application service provider;

then said application service provider further processes and creates object identification information about the object;

then said application service provider transmits said object identification information back to said mobile phone; and, then said mobile transmits said object identification information via a Wireless Radio Frequency connection to said Heads Up Display that then displays said object identification information on said handheld optical magnifying device's optics such that said observer looking through said optical magnifying device sees said object identification information along with said object in real time without having to lower said handheld optical magnifying device from said observer's eyes.

2. An object identification combined handheld optical magnifying device integrated with a camera, a Heads up Display, and a mobile phone comprising:

a handheld optical magnifying device integrated with a camera;

said camera viewing through the optics of said handheld magnifying optical device wherein said camera focuses on the same object that said handheld optical magnifying device focuses on;

wherein when an observer looking through said handheld optical magnifying device sees an object that said observer wants to identify said observer can take a picture of said object with said camera;

said handheld optical magnifying device connected via a Wireless Radio Frequency connection to a mobile phone running a computer application wherein said handheld optical magnifying device can transmit said picture to said mobile phone and said mobile phone can process said picture of said object and transfer said processed picture via a Wireless Radio Frequency connection to an application service provider that can further process and create object identification information about the object in said picture and wherein said application service provider can transmit said object identification information back to said mobile phone; and, said mobile phone transmitting said object identification information via a Wireless Radio Frequency connection to said Heads Up Display that displays said object identification information on said handheld optical magnifying device's optics such that said observer sees said object identification information along with said object in real time without having to lower said handheld optical magnifying device from said observer's eyes.

* * * * *